United States Patent [19]

Lejeune

[11] 4,026,318
[45] May 31, 1977

[54] VALVE FOR GIANT TIRES

[75] Inventor: Daniel Lejeune, Clermont-Ferrand, France

[73] Assignee: Compagnie Generale des Etablissements Michelin, raison sociale Michelin & Cie, Clermont-Ferrand, France

[22] Filed: Mar. 6, 1975

[21] Appl. No.: 556,163

[30] Foreign Application Priority Data

Mar. 11, 1974 France .............................. 74.08430

[52] U.S. Cl. ................................ 137/223; 137/231; 137/234.5; 137/533.25; 137/533.31
[51] Int. Cl.² ......................................... F16K 15/20
[58] Field of Search ............... 137/231, 234.5, 542, 137/543.21, 533.21, 223, 533.25; 251/149.1, 149.7; 192/477, 429

[56] References Cited
UNITED STATES PATENTS

| | | | |
|---|---|---|---|
| 1,247,326 | 11/1917 | Porter | 137/223 |
| 1,846,315 | 2/1932 | Crowley | 137/231 |
| 2,116,087 | 5/1938 | Wahl | 137/234.5 |
| 2,131,740 | 10/1938 | Kappelman | 251/149.7 |
| 3,486,522 | 12/1969 | Ashman | 137/234.5 |

FOREIGN PATENTS OR APPLICATIONS 1,140,742  1/1969  United Kingdom .......... 137/533.25

Primary Examiner—Harold W. Weakley
Attorney, Agent, or Firm—Brumbaugh, Graves, Donohue & Raymond

[57] ABSTRACT

A valve for giant tires comprises a tubular element and a valve member slidable within the tubular element for opening and closing the valve. The tubular element comprises a first section for connection to the valve stem of a tire, a second section forming an extension of the first section, and a third section forming an extension of the second section. The tubular element is formed with a bore which extends through the three sections and which widens in the direction from the third section to the second section and thereby forms a valve seat. The valve member comprises a rod extending longitudinally of the bore, a valve-sealing member connected to the rod for cooperation with the valve seat, a first guide member connected to the rod and being slidable within the widened bore of the second section, and a second guide member connected to the rod and being slidable within the bore of the third section.

5 Claims, 3 Drawing Figures

VALVE FOR GIANT TIRES

BACKGROUND OF THE INVENTION

This invention relates to valves and, more particularly, to novel and highly-effective valves for pressurizing or inflating large pneumatic enclosures, for instance the pneumatic tires of earth-moving equipment, and for maintaining the enclosures, once pressurized or inflated, under the desired pressure.

The diameter of tires for earth-moving equipment and other large machines in some cases exceeds three meters. The valves used heretofore for inflating tires of this type require a very long period of inflation, of the order of several tens of minutes. In order to reduce this period of time, it is conventional practice to employ a special tool to remove the valve tip, including the valve-sealing member and the valve seat, so that the inflation air can pass into the stem without encountering any substantial constriction.

The necessity of having a special inflation tool and of removing the assembly comprising the valve tip and the inner part of the valve from the path of inflation air and then putting this assembly back into place after inflation is a serious drawback of conventional valves for very large tires.

SUMMARY OF THE INVENTION

An object of the invention is to solve the problems outlined above and, in particular, to provide a valve for giant tires and the like, the valve being characterized in that, on the one hand, no part of it need be removed during inflation of the tire and, on the other hand, it is internally configured so that the inflation air does not encounter any pronounced constriction as it enters the tire, the result being that the tire can be inflated without special tools and in less time, using the same source of inflation air, than has heretofore been required.

The foregoing and other objects are attained in accordance with the invention by connecting to the valve stem of a tire of the type described above a novel valve tip whose inside cross section is as little obstructed as possible in the direction of the entrance of the air into the tire, the valve tip furthermore having a diameter the value of which corresponds to those of conventional valve stems and tips.

The valve tip in accordance with the invention comprises, in its preferred form, the following elements:
1. a tubular body comprising:
   a. a first section which is internally threaded over a certain length thereof so as to be screwed onto the valve stem which is rigidly connected with the tire,
   b. a second section forming an extension of the first and having a smooth cylindrical bore in which a first guide member of the movable valve member can slide,
   c. a third section forming an extension of the second, threaded on the outside and having a smooth cylindrical bore whose diameter is smaller than the smooth cylindrical bore of the second tubular section and in which a second guide member of the valve can slide, and
   d. a valve seat provided in an annular shoulder which connects the bore of the second section with that of the third; and
2. a movable valve member comprising a valve seal of disk shape fastened on a central longitudinal rod provided at one end with a first guide member designed to slide in the smooth bore of the second section and, at its other end, with a second guide member designed to slide in the smooth bore of the third section.

In order to permit the proper centering of the valve seal on its seat, facilitate the flow of air during the inflation, and assure a better connection of the valve seal to the rod, a cylindrical-conical part coaxial with the rod is clamped between the valve seal and the second guide member.

Moreover, in order to assure greater life for the valve seal, the valve may comprise a device which limits the compression of the seal under the effect of the pressure of the fluid contained in the pneumatic enclosure. This device may comprise a metal cup having an edge adapted to come into contact with the periphery of the seat of the valve when the valve is closed. Each of the two guides of the valve member is formed of a thin spring blade bent on itself to clamp the rod of the valve member and present three angularly-separated legs of which the ends are inscribed in an imaginary circle of a diameter slightly less than the diameter of the smooth bore in which the valve member is intended to slide. In an axial direction, the spring blade has a width sufficient to prevent its becoming skewed in the bore hole, which might cause it to become jammed.

The valve tip thus designed can be screwed permanently onto the stem of the tire by means of the internal thread provided in its first section. A first sealing ring is provided at one end of the internally threaded portion of the first section to assure a tight seal between the stem and the body of the valve tip. This annular seal has an inside diameter less than the diameter of the imaginary circle within which the ends of the legs of the first guide of the valve member are inscribed so that this seal acts as stroke-limiter for the valve member in the direction towards the open position of the valve.

The threaded portion of the third section of the body of the valve tip is intended to be connected by screwing to a standardized coupling connected to a compressed-air feed hose.

The assembling of the different parts on the rod of the valve is effected by simply introducing the rod into each of these parts. The latter are then clamped axially against one another in the following manner. The valve rod is provided, at the end thereof adjacent to the third section of the valve tip, with an enlarged head against which the second guide member strikes. The end of the rod opposite the head is also enlarged, by a plurality of protuberances, for example. After the assembly of all the parts on the rod, the end of the rod opposite the head abuts the first guide member of the valve, either directly or via an interposed spacer ring. This limits the axial displacement of the first guide member in the direction towards the end of the rod opposite the head. The parts of the valve which are fastened on the valve rod have dimensions parallel to the axis of the rod such that they are locked axially between the head of the rod and its opposite end.

The valve tip thus designed is easy to manufacture and is of small size and makes it possible to inflate a tire of very large dimensions without special tools and within a period of time substantially equal to that required under the best possible conditions prior to the invention.

Certain matter disclosed herein but not claimed is the invention of John W. Shipp and Paul D. Goodman and is disclaimed. This matter is claimed in the copending application Ser. No. 569,777, filed by the above-identified inventors on April 21, 1975 for "SPRINGLESS VALVE FOR PNEUMATIC TIRES AND THE LIKE".

BRIEF DESCRIPTION OF THE DRAWING

A better understanding of the invention can be gained from a consideration of the following detailed description of the preferred embodiment thereof, in conjunction with the appended drawing, wherein.

DESCRIPTION OF THE PREFERRED EMBODIMENTS

Figure 1:
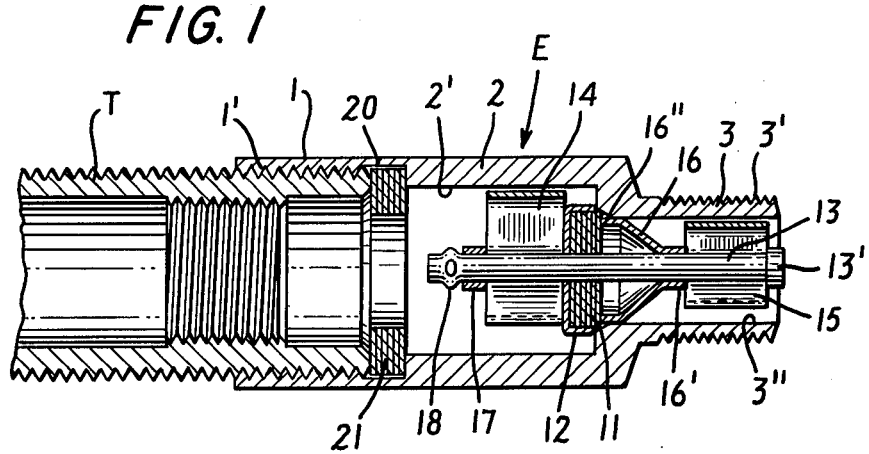
FIG. 1 is a longitudinal section through a valve tip in accordance with the invention screwed onto the end of the valve stem of a giant tire, the valve being closed.

The valve shown in the drawing comprises a valve tip body E in the form of a tubular element comprising a first section 1 whose free end has an internal thread 1' by which the tip body can be screwed onto the threaded end of the valve stem T connected to the tire to be inflated (not shown). The first section 1 is extended by a second section 2 whose bore 2' is smooth. The second section 2 is extended by a third section 3 having an external thread 3' and a smooth bore 3''. The diameter d of the bore 3'' of the third section 3 is less than the diameter D of the bore 2' of the second section 2. The thread 3' of the section 3 is intended to receive the valve cap or the air feed coupling, neither of which is shown in the drawing.

In the region of the connection of the section 1 to the section 2, an inner annular groove 20 is provided in the interior wall of the tip body E to receive an annular sealing ring 21.

In the region of the connection of the bore 2' of the section 2 to the bore 3' of the section 3, a frustoconical valve seat 10 is machined having its end of larger diameter towards the section 2. The seal of the valve member 11 may be of rubber or any other plastic material; it is of circular shape and is housed in a metal cup 12 which limits the deformation thereof. The valve-sealing member 11 in its cup 12 is fastened coaxially and tightly to a rod 13 substantially halfway between the two ends of the rod. When the valve member is acted on by the air under pressure contained in the tire, the valve-sealing member 11 is applied tightly against its frustoconical seat 10, as shown in FIG. 1.

Figure 3:
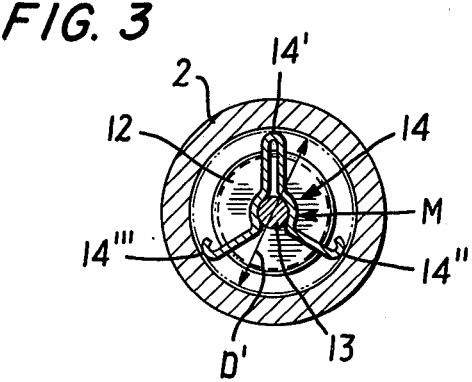
FIG. 3 is a cross sectional view along the line III—III of FIG. 2.

On the valve rod 13 there are also fastened two guide members 14 and 15, the first on the side of the valve-sealing member 11 facing towards the tire and the second on the side of the valve-sealing member 11 facing towards the source of inflation air. The guide member 14 comprises a spring blade which, as shown in FIG. 3, is folded on itself so as, on the one hand, to form a hub M which surrounds the rod 13 and, on the other hand, to present three legs having ends 14', 14'', and 14''' inscribed in an imaginary circle whose diameter D' is very slightly less than the diameter D of the smooth bore 2' of the second section 2. The guide member 15 is similar to the guide member 14 except that the imaginary circle in which the ends of its three legs are inscribed has a diameter which is very slightly less than the diameter d of the smooth bore 3'' of the section 3.

In the axial direction, the guide member 15 is immobilized between the head 13' of the rod 13 and a cylindrical-conical part 16 fastened coaxially to the rod. The part 16 has two ends 16' and 16''. At its end 16', which is of relatively small diameter, it abuts the hub of the guide member 15, while at its end 16'', which is of relatively large diameter, it abuts the side of the valve-sealing member 11 facing the valve seat 10. Thus, the end 16' clamps tightly on the rod 13, while the end 16'' is applied against the valve-sealing member 11.

The guide member 14 is immobilized in the axial direction on the one hand by the cup 12 of the valve-sealing member 11 and on the other hand by a spacer ring 17 which clamps the rod 13 and the end of which opposite the guide member 14 is in contact with protuberances 18 formed on the rod 13 at a distance from the head 13' of the rod which corresponds substantially to the sum of the axial dimensions of the guide members 14 and 15, the valve-sealing member 11 with its cup 12, the cylindrical-conical part 16 and the ring 17.

Figure 2:
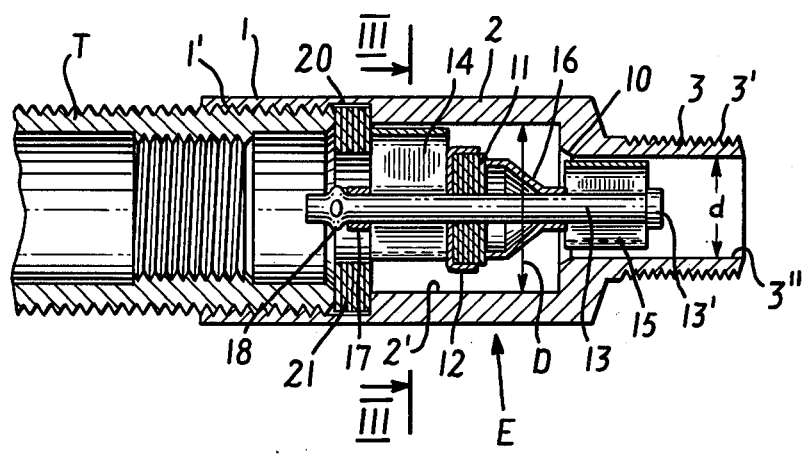
FIG. 2 is a view similar to FIG. 1 showing the same valve tip with its valve open.

When the valve tip thus formed is in place on the stem T, which forms an airtight connection with the tire, the inflation of the tire can be effected in the customary manner by screwing or force-fitting onto the section 3 of the tubular body of the tip a fitting (not shown) connected to a source of air under pressure. Under the action of this air, the valve member is pushed back to the open position (FIG. 2), so that the valve-sealing member 11 is removed from its seat 10 and the air can pass freely into the tire through the valve stem T. The axial displacement of the movable valve member comprising the parts 11, 12, 13, 14, 15, 16, 17 towards the open position is limited by the fact that the guide member 14 strikes against the annular seal 21, whose inside diameter is smaller than the imaginary circle of diameter D' (see FIG. 3) in which the ends of the legs 14', 14'', 14''' of the guide member 14 are inscribed. Once the required inflation pressure has been reached in the tire, no more air flows into the tire. When the fitting for supplying inflation air is removed, or even before, the pressure of the air contained in the tire pushes the movable valve member back to the position of FIG. 1, at which point the valve-sealing member 11 is applied securely against its seat 10, and leakage of air is prevented. A conventional valve cap (not shown) is then screwed onto the threads 3'.

Thus there is provided in accordance with the invention a novel and highly-effective valve. In the open position, it defines a path for the flow of inflation air which in its smallest cross section is substantially larger than conventional valves. It is thus ideally suited to inflate giant pneumatic tires and the like in a minimum of time.

Many modifications of the preferred structure described above and illustrated in the drawing will occur to those skilled in the art upon consideration of this disclosure. For example, it is not essential that the bore be circular in cross section, that the guide members 14, 15 be made in the form of a spring blade, or that the part 16 be cylindrical-conical. Also, the valve can be used on small tires, etc., even though its greatest utility is on giant tires and the like. Accordingly, the invention is to be construed as including all the embodiments thereof that are within the scope of the appended claims.

I claim:

1. A valve comprising a tubular element and a valve member movable with the tubular element for opening and closing the valve.

the tubular element comprising a first section for connection to the valve stem of a giant tire or the like, a second section forming an extension of the first section, and a third section forming an extension of the second section, and the tubular element being formed with a bore which extends through the three sections and which widens in the direction from the third section to the second section and thereby forms a valve seat, and the valve member comprising a rod extending longitudinally of the bore, a valve-sealing member connected to the rod for cooperation with the valve seat, a first guide member connected to the rod and being slidable within the widened bore of the second section, and a second guide member connected to the rod and being slidable within the bore of the third section, whereby the valve has particular utility for inflating giant tires and the like, further comprising a spacer connected to the rod and abutting, at one end, the second guide member and, at the other end, the valve-sealing member, wherein the spacer is of cylindrical-conical shape and is of relatively small diameter at said one end and of relatively large diameter at said other end.

2. A valve comprising a tubular element and a valve member movable within the tubular element for opening and closing the valve, the tubular element comprising a first section for connection to the valve stem of a giant tire or the like, a second section forming an extension of the first section, and a third section forming an extension of the second section, and the tubular element being formed with a bore which extends through the three sections and which widens in the direction from the third section to the second section and thereby forms a valve seat, and the valve member comprising a rod extending longitudinally of the bore, a valve-sealing member connected to the rod for cooperation with the valve seat, a first guide member connected to the rod and being slidable within the widened bore of the second section, and a second guide member connected to the rod and being slidable within the bore of the third section, whereby the valve has particular utility for inflating giant tires and the like, wherein each of the guide members comprises a spring blade shaped to clamp the rod and to have three legs spaced angularly around the rod, the ends of the legs being inscribed in an imaginary circle of a diameter slightly less than that of the bore at the location of said guide member, so that each member slides easily within the bore.

3. A valve according to claim 2 comprising an annular seal for sealing the tubular element to the valve stem, the annular seal having an inside diameter smaller than the diameter of the imaginary circle within which the ends of the legs of the first guide member are inscribed, so that the annular seal limits the opening movement of the valve member.

4. A valve comprising a tubular element and a valve member movable within the tubular element for opening and closing the valve, the tubular element comprising a first section for connection to the valve stem of a giant tire or the like, a second section forming an extension of the first section, and a third section forming an extension of the second section, and the tubular element being formed with a bore which extends through the three sections and which widens in the direction from the third section to the second section and thereby forms a valve seat, and the valve member comprising a rod extending longitudinally of the bore, a valve-sealing member connected to the rod for cooperation with the valve seat, a first guide member connected to the rod and being slidable within the widened bore of the second section, and a second guide member connected to the rod and being slidable within the bore of the third section, whereby the valve has particular utility for inflating giant tires and the like, further comprising a rigid cup, the valve-sealing member being mounted within the cup and the cup being engageable with the bore around the periphery of the valve seat when the valve is closed.

5. A valve according to claim 4 wherein the cup is made of metal.

* * * * *